United States Patent
Fadel et al.

(10) Patent No.: US 11,423,346 B2
(45) Date of Patent: Aug. 23, 2022

(54) SYSTEM AND METHOD FOR IMPROVING HUMAN-CENTRIC PROCESSES

(71) Applicant: Augmentir Inc., Horsham, PA (US)

(72) Inventors: Russell Fadel, Pebble Beach, CA (US);
Philip J. Huber, Orange, CA (US);
John Canosa, Spencerport, NY (US);
Lawrence Fan, Irvine, CA (US);
Mustafa Onur Kabul, Apex, NC (US)

(73) Assignee: Augmentir, Inc., Horsham, PA (US)

( * ) Notice: Subject to any disclaimer, the term of this patent is extended or adjusted under 35 U.S.C. 154(b) by 26 days.

(21) Appl. No.: 16/849,744

(22) Filed: Apr. 15, 2020

(65) Prior Publication Data

US 2020/0334607 A1    Oct. 22, 2020

Related U.S. Application Data

(60) Provisional application No. 62/834,619, filed on Apr. 16, 2019.

(51) Int. Cl.
*G06Q 10/00*     (2012.01)
*G06Q 10/06*     (2012.01)
(Continued)

(52) U.S. Cl.
CPC ..... *G06Q 10/06375* (2013.01); *G06K 9/6257* (2013.01); *G06N 5/046* (2013.01); *G06N 20/20* (2019.01); *G06Q 10/06398* (2013.01)

(58) Field of Classification Search
None
See application file for complete search history.

(56) References Cited

U.S. PATENT DOCUMENTS

| 2009/0043621 A1* | 2/2009 | Kershaw | G06Q 10/06398 |
| | | | 705/7.17 |
| 2009/0234720 A1* | 9/2009 | George | G06Q 10/06 |
| | | | 705/7.42 |

(Continued)

OTHER PUBLICATIONS

Bodin, Eric, Video content annotation automation using machine learning techniques, Sep. 3, 2014, http://www.diva-portal.org/smash/get/diva2:762678/FULLTEXT01.pdf, p. 1-63. (Year: 2014).*

(Continued)

*Primary Examiner* — Joseph M Waesco
(74) *Attorney, Agent, or Firm* — Nixon Peabody LLP

(57) ABSTRACT

A system and method of generating a plurality of actionable insights is disclosed herein. A computing system retrieves data corresponding to a work procedure. Each work procedure includes a plurality of steps. The computing system generates a predictive model for each actionable insight using a plurality of machine learning models by generating an input training based on the retrieved work procedure data and learning, by the plurality machine learning models, a metric corresponding to each actionable insight based on each respective input training set. The input data set for each actionable insight includes actionable insight specific information. The computing system receives a request to generate a plurality of actionable insights for a current work procedure. The computing system generates, via the predictive models, a plurality of metrics for a plurality of actionable insights based on data corresponding to the current work procedure.

20 Claims, 5 Drawing Sheets

(51) Int. Cl.
*G06K 9/62* (2022.01)
*G06N 5/04* (2006.01)
*G06N 20/20* (2019.01)

(56) References Cited

U.S. PATENT DOCUMENTS

| | | | | |
|---|---|---|---|---|
| 2009/0287543 | A1* | 11/2009 | Allderdice | G06Q 40/10 |
| | | | | 705/37 |
| 2013/0325763 | A1* | 12/2013 | Cantor | G06Q 10/06312 |
| | | | | 706/12 |
| 2015/0193699 | A1* | 7/2015 | Kil | G06N 5/022 |
| | | | | 706/12 |
| 2016/0196511 | A1* | 7/2016 | Anisingaraju | G06Q 50/01 |
| | | | | 705/7.11 |
| 2017/0076237 | A1* | 3/2017 | Hazy | G06Q 10/06375 |
| 2018/0075139 | A1* | 3/2018 | Sadovsky | G06N 20/20 |
| 2018/0246797 | A1* | 8/2018 | Modi | G06F 11/3476 |
| 2018/0293911 | A1* | 10/2018 | Rastegar-Panah | G06F 16/211 |
| 2019/0324438 | A1* | 10/2019 | Celia | G06T 11/206 |

OTHER PUBLICATIONS

International Search Report and Written Opinion from corresponding PCT International Patent Application No. PCT/US2020/028334 dated Jun. 29, 2020.

International Preliminary Report on Patentability from corresponding PCT International Patent Application No. PCT/US2020/028334 dated Oct. 28, 2021.

* cited by examiner

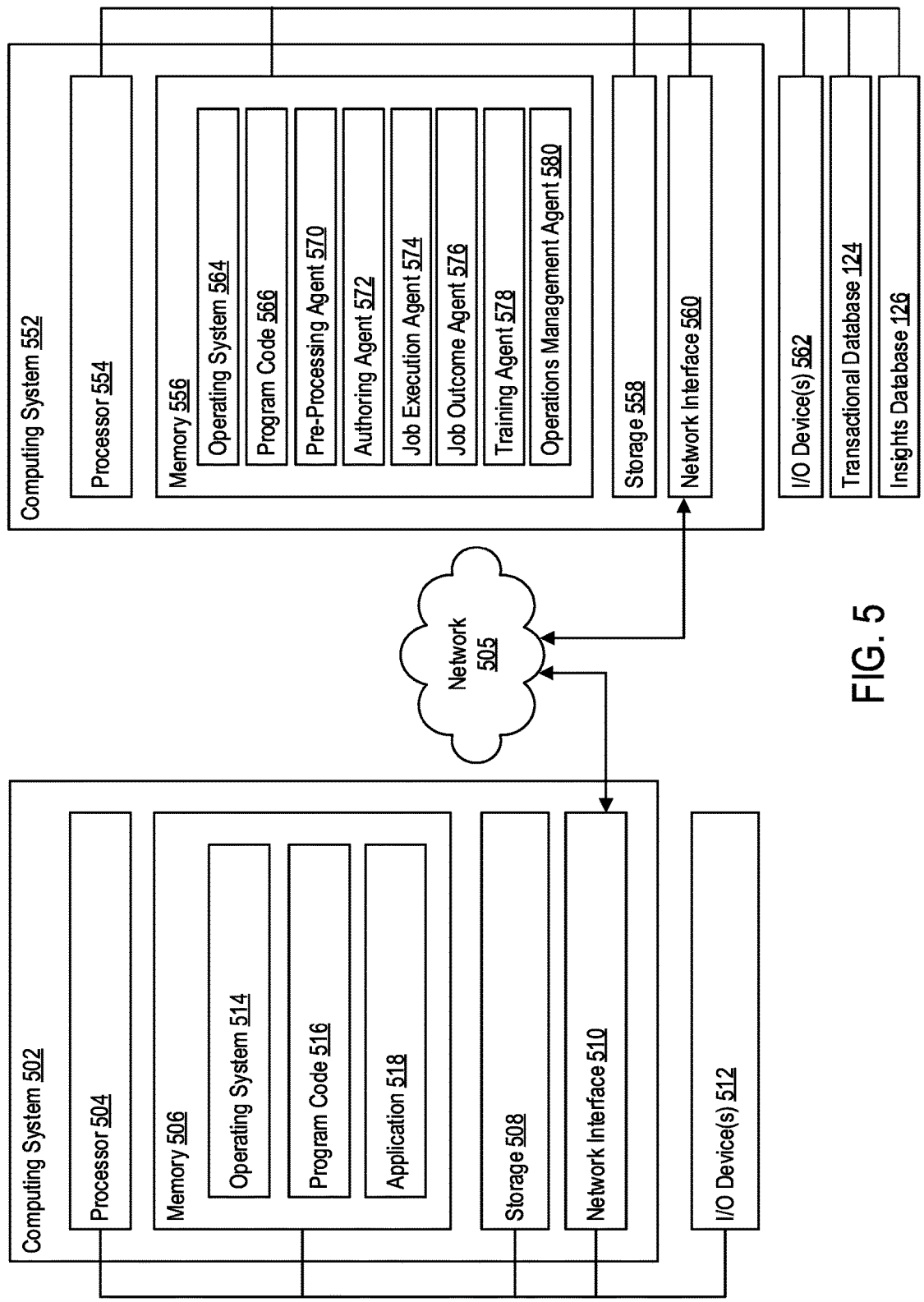

SYSTEM AND METHOD FOR IMPROVING HUMAN-CENTRIC PROCESSES

FIELD OF THE DISCLOSURE

The present disclosure generally relates to a system and method for generating a plurality of actionable insights for a work procedure.

BACKGROUND

Determining where there is an opportunity for productivity improvement in frontline workers is an issue that conventional systems have attempted to solve unsuccessfully. For example, in conventional systems, such productivity improvements were performed through time and motion studies, i.e., watching a person do his or her job for a short period of time and then analyzing this data to identify those activities, steps, etc., that need to be changed to increase productivity. Such studies were often ineffective and time consuming.

SUMMARY

Embodiments disclosed herein generally relate to a system and method for generating a plurality of actionable insights for a work procedure. In some embodiments, a method of generating a plurality of actionable insights is disclosed herein. A computing g system retrieves data corresponding to a work procedure. Each work procedure includes a plurality of steps. The computing system generates a predictive model for each actionable insight using a plurality of machine learning models by generating an input training based on the retrieved work procedure data and learning, by the plurality machine learning models, a metric corresponding to each actionable insight based on each respective input training set. The input data set for each actionable insight includes actionable insight specific information. The computing system receives a request to generate a plurality of actionable insights for a current work procedure. The computing system generates, via the predictive models, a plurality of metrics for a plurality of actionable insights based on data corresponding to the current work procedure.

In some embodiments, a non-transitory computer readable medium is disclosed herein. The non-transitory computer readable medium includes one or more sequences of instructions, which, when executed by one or more processors, cause the one or more processors to perform operations. The operations include retrieving, by a computing system, data corresponding to a work procedure. Each work procedure includes a plurality of steps. The operations further include generating, by the computing system, a predictive model for each actionable insight using a plurality of machine learning models by generating an input training based on the retrieved work procedure data and learning, by the plurality machine learning models, a metric corresponding to each actionable insight based on each respective input training set. The input data set for each actionable insight includes actionable insight specific information. The operation further includes receiving, by the computing system, a request to generate a plurality of actionable insights for a current work procedure. The operations further include generating, by the computing system via the predictive models, a plurality of metrics for a plurality of actionable insights based on data corresponding to the current work procedure.

In some embodiments, a system is disclosed herein. The system includes a processor and memory. The memory has programming instructions stored thereon, which, when executed by the processor, performs one or more operations. The one or more operations include retrieving data corresponding to a work procedure. Each work procedure includes a plurality of steps. The one or more operations further include generating a predictive model for each actionable insight using a plurality of machine learning models by generating an input training based on the retrieved work procedure data learning, by the plurality machine learning models, a metric corresponding to each actionable insight based on each respective input training set. The input data set for each actionable insight includes actionable insight specific information. The one or more operations further include receiving a request to generate a plurality of actionable insights for a current work procedure. The one or more operations further include generating, via the predictive models, a plurality of metrics for a plurality of actionable insights based on data corresponding to the current work procedure.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrated only typical embodiments of this disclosure and are therefore not to be considered limiting of its scope, for the disclosure may admit to other equally effective embodiments.

FIG. 5 is a block diagram illustrating a computing environment, according to example embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

One or more techniques described herein may guide a worker through a process using augmented procedures executing on user devices (e.g., mobile devices, tablets, smart glasses, wearables, etc.). The system may be configured to receive, from the user devices, high granularity activity data for use in an artificial intelligence engine. The artificial intelligence engine may use this data to continuously identify the magnitude of raw productivity improvement opportunity. In some embodiments, the artificial intelligence engine may be configured to eliminate opportunity that is not capturable, by identifying and eliminating outliers in the data before defining a metric corresponding thereto (e.g., "True Opportunity"). In some embodiments, the artificial intelligence engine may determine what actions may be necessary to capture this true productivity improvement opportunity.

At a high level, for example, the one or more techniques disclosed herein may be configured to generate actionable insights through an embedded artificial intelligence engine. For example, by consuming high resolution data generated by the end users of a variety of roles and production, the present system may deliver such results tailored to the needs of end users, with the goal of improving user objectives in a timely manner.

The term "user" as used herein includes, for example, a person or entity that owns a computing device or wireless device; a person or entity that operates or utilizes a computing device; or a person or entity that is otherwise associated with a computing device or wireless device. It is contemplated that the term "user" is not intended to be limiting and may include various examples beyond those described.

Figure 1:
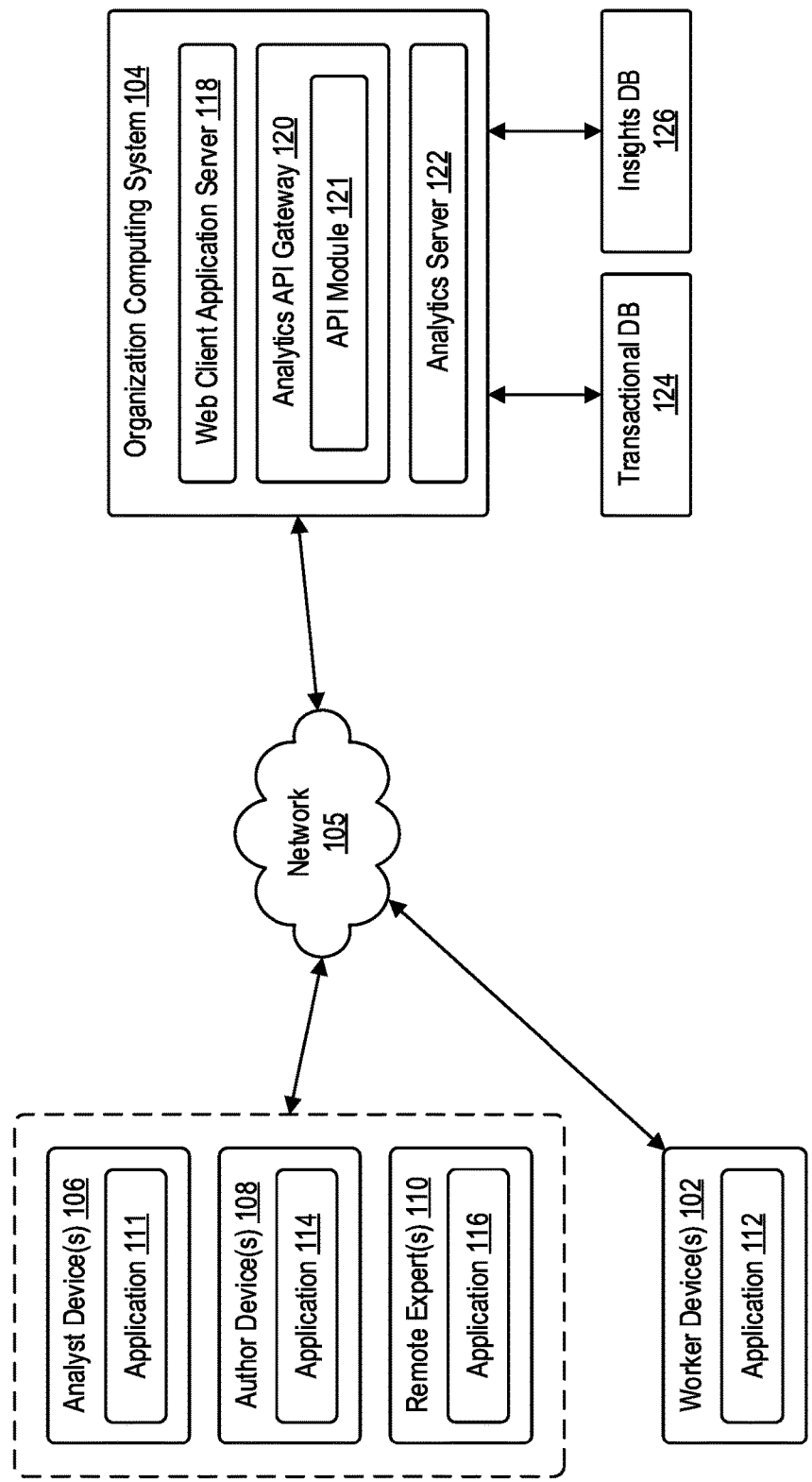
FIG. 1 is a block diagram illustrating a computing environment, according to example embodiments.

FIG. 1 is a block diagram illustrating a computing environment 100, according to one embodiment. Computing environment 100 may include at least one or more worker devices 102, organization computing system 104, one or more author devices 108, one or more remote experts 110, a transactional database 24, and a insights database 126 communicating via network 105.

Network 105 may be of any suitable type, including individual connections via the Internet, such as cellular or Wi-Fi networks. In some embodiments, network 105 may connect terminals, services, and mobile devices using direct connections, such as radio frequency identification (RFID), near-field communication (NFC), Bluetooth™, low-energy Bluetooth™ (BLE), Wi-Fi™ ZigBee™, ambient backscatter communication (ABC) protocols, USB, WAN, or LAN. Because the information transmitted may be personal or confidential, security concerns may dictate one or more of these types of connection be encrypted or otherwise secured. In some embodiments, however, the information being transmitted may be less personal, and therefore, the network connections may be selected for convenience over security.

Network 105 may include any type of computer networking arrangement used to exchange data or information. For example, network 105 may be the Internet, a private data network, virtual private network using a public network and/or other suitable connection(s) that enables components in computing environment 100 to send and receive information between the components of system 100.

Author device 108 may be representative of computing devices, such as, but not limited to, a mobile device, a tablet, a desktop computer, or any computing system having the capabilities described herein. For example, author device 108 may be any device capable of executing software (e.g., application 114) configured to author work procedures. Author device 108 may include application 114. In some embodiments, application 114 may be representative of a web browser that allows access to a web site. In some embodiments, application 114 may be representative of a stand-alone application. Author device 108 may access application 114 to access functionality of organization computing system 104. In some embodiments, author device 108 may communicate over network 104 to request a web page, for example, from web client application server 118 of organization computing system 104. The content that is displayed to author device 108 may be transmitted from web client application server 118 to author device 108, and subsequently processed by application 114 for display through a graphical user interface (GUI) of author device 108.

Author device 108 may be configured to execute application 118 to generate a new work procedure for assisting workers in performing a hands-on job, such as, but not limited to, equipment service, manufacturing assembly, or machine calibration. Exemplary work procedures may include any combination of text, pictures, movies, three-dimensional computer aided design (3D CAD), remote expert sessions, and mixed reality sessions to aid the worker in completing a task and tracking task completion.

Worker device 102 may be representative of a computer device, such as, but not limited to, a mobile device, a tablet, a desktop computer, a wearable device, smart glasses, or any computing system having the capabilities described herein. For example, worker device 102 may be any device capable of executing software (e.g., application 112) configured to receive and display work procedures generated by an author device 108.

Worker device 102 may include application 112. In some embodiments, application 112 may be representative of a web browser that allows access to a website. In some embodiments, application 112 may be representative of a stand-alone application. Worker device 102 may execute application 112 to access functionality of organization computing system 104. In some embodiments, worker device 102 may communicate over network 105 to request a web page, for example, from web client application server 118 of organization computing system 104. For example, worker device 102 may request a work procedure from web client application server 118 for a particular hands-on job. The content that is displayed to worker device 102 may be transmitted from web client application server 118 to worker device 102, and subsequently processed by application 112 for display through a GUI of worker device 102.

In some embodiments, worker device 102 may be further configured to transmit activity data to organization computing system 104 for review and analysis. For example, via application 112, worker device 102 may transmit high granularity activity data to organization computing system 104, such that organization computing system 104 may analyze the activity data to improve (or optimize) the work procedure. Such high granularity activity data may include, but is not limited to, time it takes the worker to complete each step, whether the worker watched a video included in the work procedure, whether the worker stopped the video included in the work procedure early, whether the worker contacted a remote expert, what problems or questions were raised, whether the remote expert took any action, including making specific suggestions or recommendations, whether the user completed the work procedure, and the like.

Analyst device 106 may be representative of a computing device, such as, but not limited to, a mobile device, a tablet, a desktop computer, or any computing system having the capabilities described herein. For example, analyst device 106 may be any device capable of executing software (e.g., application 111) configured to access organization computing system 104.

Analyst device 106 may include application 111. In some embodiments, application 111 may be representative of a web browser that allows access to a website. In some embodiments, application 111 may be representative of a stand-alone application. Analyst device 106 may execute application 111 to access functionality of organization computing system 104. In some embodiments, analyst device 106 may communicate over network 105 to request a web page, for example, from web client application server 118 of organization computing system 104. The content that is displayed via analyst device 106 may be transmitted from web client application server 118 to analyst device 106, and subsequently processed by application 111 for display through GUI of analyst device 102. In some embodiments, analyst device 106 may act as the access point for data and visualization of that data along with generated insights and recommendations. The Analysts actions and responses to these insights and recommendations, such as dismissing an insight and not taking any action on it. In some embodiments, actions performed by analyst devices 106 may be used as input to the machine learning model to better refine the model's generation of the insights.

Remote expert device 110 may be representative of a computing device, such as, but not limited to, a mobile device, a tablet, a desktop computer, or any computing system having the capabilities described herein. For example, remote expert device 110 may be any device capable of executing software (e.g., application 116) configured to access organization computing system 104.

Remote expert device 110 may include application 116. In some embodiments, application 116 may be representative of a web browser that allows access to a website. In some embodiments, application 116 may be representative of a stand-alone application. Remote expert device 110 may execute application 116 to access functionality or organization computing system. For example, remote expert device 110 may execute application 116 responsive to a request from a worker device 102 for guidance regarding an operation in a work procedure. Via application 116, through organization computing system 104, worker device 102 may be connected with a respective remote expert device 110. For example, in some embodiments, remote expert device 110 may communicate over network 105 to request a web page, for example, from web client application server 118 of organization computing system 104. The content that is displayed to remote expert device 110 may be transmitted from web client application server 118 to author remote expert device, 110 and subsequently processed by application 116 for display through a GUI of remote expert device 110. In other words, remote expert device 110 may enable a worker to stream live video and audio to remote experts. Both the expert and the worker may annotate either the live video or a freeze frame image. In some embodiments, remote expert device 110 may be presented with a complete history of the job that the worker is executing. The complete history may provide remote expert device 110 with the ability to "go back in time" to review the steps that were taken and the data that was input up to the time the remote expert session was established.

In some embodiments, remote expert device 110 may be further configured to transmit activity data to organization computing system 104 for review and analysis. For example, via application 116, remote expert device 110 may transmit high granularity activity data to organization computing system 104, such that organization computing system 104 may analyze the activity data to improve (or optimize) the work procedure, and to improve the selection of remote experts. Such high granularity activity data may include, but is not limited to, the assistance provided to worker device 102 during a respective work procedure, in the formats of audio, video, and text.

Organization computing system 104 may represent a computing platform configured to host a plurality of servers. In some embodiments, organization computing system 104 may be composed of several computing devices. For example, each computing device of organization computing system 104 may serve as a host for a cloud computing architecture, virtual machine, container, and the like.

Organization computing system 104 may include at least web client application server 118, analytics application programming interface (API) gateway 120, and analytics server 122. Web client application server 118 may be configured to host one or more webpages accessible to one or more of analyst device 106, author device 108, remote expert device 110, and/or worker device 102. In some embodiments, web client application server 118 may host one or more webpages that allow an author device 108 to generate a work procedure to be accessed by one or more worker device 102. For example, author device 108 may access In another example, web client application server 118 may host one or more webpages that allow a worker device 102 to access one or more work procedures directed to the worker device 102.

Analytics server 122 may be configured to generate one or more actionable insights based on user activity data. For example, analytics server 122 may consume high resolution data generated by one or more of analyst device 106, author device 108, remote expert device 110, and worker device 102. From the high resolution data, analytics server 122 may be configured to generate one or more actionable insights related to a specific work procedure. Such insights may include, but are not limited to an author index (which may help users assess the needs of the authors and improve their skills, as well as better match their qualifications to the upcoming new tasks), dynamically improved (or optimized) and individualized work instructions for each worker device 102, a true opportunity score, a worker index, and the like. Analytics server 122 is described in more detail below in conjunction with FIG. 2.

Analytics API gateway 120 may be configured to act as an interface between web client application server 118 and analytics server 122. For example, analytics API gateway server 120 may be configured to transmit data collected by web client application server 118 to analytics server 122. Likewise, analytics API gateway server 120 may be configured to transmit insights generated by analytics server 122 to web client application server 118.

Analytics API gateway 120 may include API module 121. API module 121 may include one or more instructions to execute one or more APIs that provide various functionalities related to the operations of organization computing system 104. In some embodiments, API module 121 may include an API adapter that allows API module 121 to interface with and utilize enterprise APIs maintained by organization computing system 104 and/or an associated entity. In some embodiments, APIs may enable organization computing system 104 to communicate with one or more of worker device 102, analyst device 106, author device 108, remote expert device 110, or one or more third party devices.

In some embodiments, data collection and acquisition process provided by organization computing system 104 may include, but is not limited to: data from definition, modification and execution of new and existing procedures, data collected from external sources such as internet of things (IoT) devices, customer relation management (CRM) devices, enterprise resource planning (ERP) devices by means of integrations provided to those systems, data collected from extended resources such as customers associated with organization computing system 104, data through human-in-the-loop feedback mechanism, which provides valuable domain expertise, and the like Organization computing system 104 may communicate with transactional database 124 and insights database 126. Transactional database 124 may be configured to store raw data received (or retrieved) from one or more of worker devices 102, analyst devices 106, author devices 108, remote expert devices 110, and the like. For example, web client application server 118 may be configured to receive data from one or more of worker devices 102, analyst devices 106, author devices 108, remote expert devices 110 and store that data in transactional database 124. Insights database 126 may be configured to store one or more actionable insights generated by analytics server 122. In operation, for example, analytics API gateway 120 may pull information from transactional database 124 and provide said information to analytics server 122 for further analysis. Upon generating one or more actionable insights via artificial intelligence and machine learning, analytics server 122 may be configured to store the generated insights in insights database 126. Analytics API gateway 120 may, in turn, pull the generated insights from insights database 126 and provide the insights to web client application server 118 for transmission to one or more of analyst device 106, author device 108, and/or worker device 110.

Figure 2:
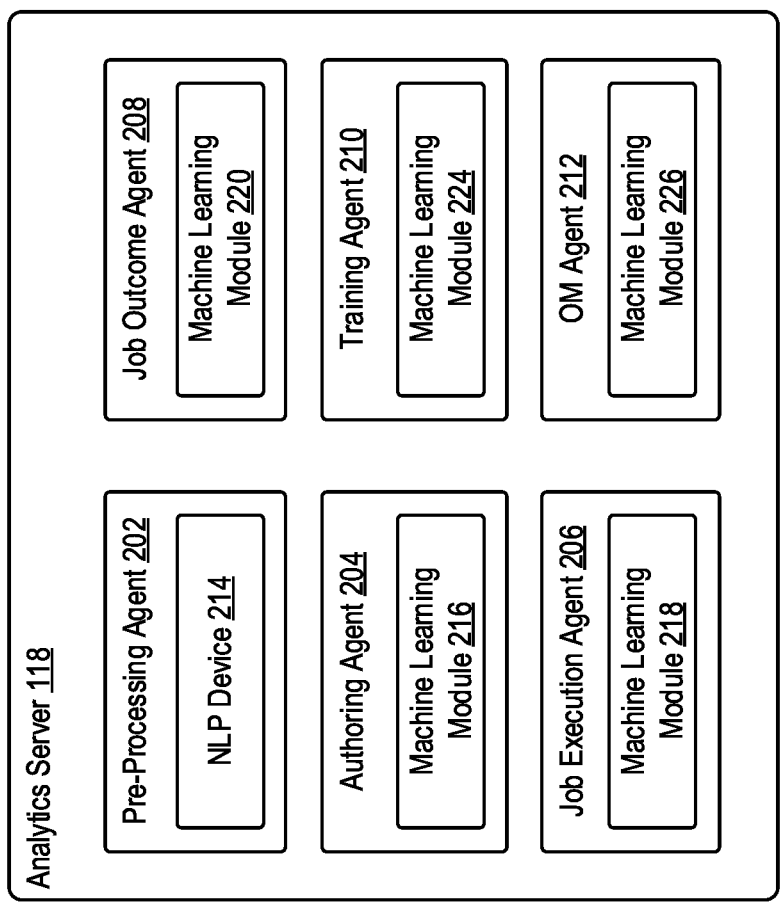
FIG. 2 is a block diagram illustrating an analytics server, according to example embodiments.

FIG. 2 is a block diagram illustrating analytics server 122 in greater detail, according to example embodiments. As illustrated, analytics server 122 may include pre-processing agent 202, authoring agent 204, job execution agent 206, job outcome agent 208, training agent 210, and operations management (OM) agent 212. Each of pre-processing agent 202, authoring agent 204, job execution agent 206, job outcome agent 208, training agent 210, and OM agent 212 may be comprised of one or more software modules. The one or more software modules may be collections of code or instructions stored on a media (e.g., memory of analytics server 118) that represent a series of machine instructions (e.g., program code) that implements one or more algorithmic steps. Such machine instructions may be the actual computer code the processor of analytics server 118 interprets to implement the instructions or, alternatively, may be a higher level of coding of the instructions that is interpreted to obtain the actual computer code. The one or more software modules may also include one or more hardware components. One or more aspects of an example algorithm may be performed by the hardware components (e.g., circuitry) itself, rather as a result of an instructions.

Pre-processing agent 202 may be configured to process data received from one or more of analyst device 106, author device 108, remote expert device 110, and/or client device 102. For example, pre-processing agent 202 may be configured to extract relevant information for the raw data and format it in a way that is compatible with an underlying algorithm, in which the data is used as input. In some embodiments, pre-processing agent 202 may identify up and down times of the work executions, of out of ordinary data points, remove irrelevant or noisy data points based upon the feedback from analysts, and the like. In some embodiments, pre-processing agent 202 may further use data enhancement techniques such as, but not limited to, combining data points coming from different versions of work instructions based upon their similarity. Such prepared data may be stored in transactional database 124.

In some embodiments, pre-processing agent 202 may further be configured to extract one or more features from the prepared data. For example, pre-processing agent 202 may be configured to generate one or more data sets for each of authoring agent 204, job execution agent 206, job outcome agent 208, training agent 210, and OM agent 212 by extracting select features from the prepared data. Pre-processing agent 202 may include natural language processor (NLP) device 214. NLP device 214 may be configured to retrieve prepared data from transaction database 124 and scan the prepared data to learn and understand the content contained therein. NLP device 214 may then selectively identify portions of the prepared data that correspond to each respective agent. Based on this identification, pre-processing agent 202 may extract certain features for preparation of a data set for a particular agent.

Authoring agent 204 may be configured to improve the description of the set of activities that may lead to a desired outcome in a work procedure. As stated above, author devices 108 may be configured to define electronic work instructions (e.g., work procedures) in a highly structured, but flexible, way. Such functionality may allow authors to prescribe activities in self-contained chunks that correspond to major steps needed to accomplish an underlying end result. In some embodiments, the steps may be defined through a collection of different units of work (e.g., "cards"). Each card may include, for example, a variety of different avenues for relaying instructions to a worker device 102. Such avenues may include, but are not limited to, text, table, checklist, images, videos, and the like.

One of the key problems in defining electronic work instructions is identifying which methodology provides the best (or optimal) content for the worker. Authoring agent 204 may be configured to aid in reducing the time it takes to reach an "optimal" procedure by providing insights to a work procedure through the use of the underlying procedure definition data, the experience representation (which may be built using historical data of successful work procedures) and correlations with execution patterns. For example, authoring agent 204 may be configured to generate actionable insights about an instruction's impact on the speed of execution, consistency of cycle time, and the quality of outcomes. Authoring agent 204 may generate a unique measure called "author index," which may help organizations assess the needs of the authors and improve their skills, as well as better match their qualifications to upcoming tasks. Author index may represent a scoring mechanism to assess the process of authoring the electronic work instructions. In some embodiments, the score can be used to compare a given authoring process of a given work instructions for a specific product across other authoring processes of work instructions for similar products in order to identify the improvement opportunities for corresponding authors. This score may provide a benchmark as well as a measurement of goodness of such processes. For example. a given authoring process of a quality assurance (QA) procedure, which may include the number of versions it goes through, the count and types of different steps and cards, the time and quality indicators of the executed tasks can be used to create a score that would fairly compare that process against the authoring process of other similar procedures. This score value may provide insights into how the authoring process to proceed.

Authoring agent 204 may include machine learning module 216. Machine learning module 216 may include one or more instructions to train a prediction model to generate the author index described above. To train the prediction model, machine learning module 120 may receive, as input, one or more sets of training data generated by pre-processing agent 202. The training data utilized by authoring agent 204 may include but is not limited to: the versions of the instructions, the sequence of changes that are made to the instructions over time, number of steps, cards and their types, the way the instructions are expressed in terms of natural language and the style, the execution data in terms of cycle time, quality, and the sequence in which the work instructions are carried out as well as the patterns of up and down times, and the like. Machine learning module 216 may implement one or more machine learning algorithms to train the prediction model to generate the author index. Machine learning module 116 may use one or more of AB testing, a decision tree learning model, association rule learning model, artificial neural network model, deep learning model, inductive logic programming model, support vector machine model, clustering mode, Bayesian network model, reinforcement learning model, representational learning model, similarity and metric learning model, rule based machine learning model, and the like to train the prediction model.

Job execution agent 206 may be configured to generate one or more actionable insights for improving (or optimizing) work instructions for a given worker device 102. One of the main challenges in human-centric-processes is the inherent variability of the humans. Such variability may place a huge strain on predictive systems that may be used for planning purposes. On the other hand, humans also provide flexibility to the system. For example, by employing workers rather than automated machines, a manufacturing organization may provide a huge variety of offerings. When author device 106, for example, generates a work procedure, the author may attempt to strike a balance between variability and flexibility. For example, such electronic work procedures may allow a user to standardize how the work should be accomplished, while also allowing for individualization as to how the instructions are delivered to respective worker devices 102.

Job execution agent 206 may be configured to continuously measure the "goodness" of the executions of underlying instructions. For example, job execution agent 206 may include machine learning module 218. Machine learning module 218 may include one or more instructions to train a prediction model to generate one or more actionable insights for improving work instructions for a given worker device 102. To train the prediction model, machine learning module 218 may receive, as input, one or more sets of training data generated by pre-processing agent 202. The training data utilized by authoring agent 204 may include up and down times, utilization of various media helpers, the order in which instructions are carried out, underlying experience and historical performance of the workers, worker's year of experience with the organization, the skill improvement training each worker has participated in, and the like. Machine learning module 218 may implement one or more machine learning algorithms to train the prediction model to generate a score associated with the quality of the instructions in a work procedure. For example, instead of machine learning module 218 may generate a quality of fit for a given worker is as a way to individualize the work instructions in such that they best serves the workers. Machine learning module 218 may use one or more, a decision tree learning model, association rule learning model, artificial neural network model, deep learning model, inductive logic programming model, support vector machine model, clustering mode, Bayesian network model, reinforcement learning model, representational learning model, similarity and metric learning model, rule based machine learning model, and the like to train the prediction model.

Based on the value generated by job execution agent 206, the system may be configured to provide dynamically optimized and individualized work instructions to enable each worker device to perform each time in the least amount of time possible, while achieving quality, safety, and productivity goals. In some embodiments, to achieve such dynamic optimization goal, the system may use techniques that involve, but are not limited to, exhibition or concealment of certain helper content, providing training refreshers, switching from verbose or succinct versions of the instructions, variations in the order in which steps are presented, and the like.

In some embodiments, job execution agent 206 may further provide unique insights into how the underlying worker execution fits with the set of identified goals, what kind of automatic interventions have been applied, and what kind of results have been attained from them. For example, consider a scenario in which five hundred units of the same product needs to be assembled for a given job order with certain time and quality targets. Job execution agent 206 may dynamically monitor the underlying executions and alter the details of the instructions provided to the user based upon that data. For example, given a worker establishing a good time average for the cycle time, he/she may no longer need the most detailed version of the instructions. Accordingly, job execution agent 206 may automatically make this switch. Similarly. a worker not establishing the required quality target can dynamically be provided with extended video instructions on the problematic step. In addition, the impact of these interventions may be provided to the stakeholders as insights for further training of workers or enhancement of work instructions.

Job outcome agent 208 may be configured to generate an opportunity value for a work procedure. One of the issues with human centric processes is the difficulty in collecting relevant data related to said human activities. Traditionally, conventional systems used time and motion studies, essentially watching a person do their job for a short period of time and then analyzing this data to identify what needed to be changed to increase productivity. Such techniques are typically expensive, intrusive to operations, and one-shot efforts. Job outcome agent 208 is configured to provide a unique solution that eliminates the downfalls of conventional systems. For example, through the use of granularity data transmitted by worker devices 102 to organization computing system 104, job outcome agent 208 may be configured to generate an opportunity value.

Job outcome agent 208 may include machine learning module 220. Machine learning module 220 may be configured to generate a raw opportunity score. For example, machine learning module 220 may include one or more instructions to train a prediction model to generate the raw opportunity score. To train the prediction model, machine learning module 220 may receive, as input, one or more sets of training data generated by pre-processing agent 202. The training data utilized by job outcome agent 208 may include, but is not limited to, time spent on productive and non-productive sections of each card (or step), the information related to the identity of the worker device 102, status and quality of the underlying products that are being worked on, historical performance of the workers, the corresponding tools involved in the operation, and the like. Using this data, prediction model may be trained to identify a raw opportunity score.

From the raw opportunity score, job outcome agent 208 may generate a true opportunity score. For example, machine learning model 220 may further train the prediction model to generate the true opportunity using one or more machine learning algorithms. Machine learning module 220 may use one or more, a decision tree learning model, association rule learning model, artificial neural network model, deep learning model, inductive logic programming model, support vector machine model, clustering mode, Bayesian network model, reinforcement learning model, representational learning model, similarity and metric learning model, rule-based machine learning model, and the like to train the prediction model. The true opportunity score may be determined against a data driven benchmarks using techniques that involve, but are not limited to, identification and exclusion of noisy data points, adjustments taking into account the historical performance of the agent's quality, and resource state indicators.

In some embodiments, the true opportunity score may be continuously updated as more data is available to the system. Accordingly, job outcome agent 208 may provide a forward looking value that may be attained as a productivity improvement. Moreover, in some embodiments, job outcome agent 208 may qualify this score in terms of how much effort it would involve for the productivity improvement. This effort value may be attributed to various interventions that need to be done, such as, but not limited to, training required for the works or enhancements that should be made to the underlying procedure.

Training agent 210 may be configured to generate a worker index, which may quantify the learning needs and performance index of each worker (e.g., worker device 102). Generally, matching workers' skills to underlying tasks is a challenging process. Such process becomes convoluted due to the constant changes in the workforce and product requirements. For example, identifying, measuring, and meeting the learning needs of the workforce typically depends on a comprehensive evaluation of the individuals, the tasks, and the way in which the individuals are instructed to carry out those tasks.

Training agent 210 improves upon conventional systems by generating a multidimensional representation of the current state of the worker (e.g., associate/agent) in relation to the relative complexity of the activities involved in the current tasks that the given individual is assigned by making use of attributes of the worker and historical execution data collected by the platform. This representation of the worker may be used to quantify the learning needs and the performance index of the worker, i.e., the worker index. This score may constitute the basis for the continuous assessment of the training needs of each worker.

To generate the worker index, training agent 210 may include machine learning module 224. Machine learning module 224 may include one or more instructions to train a prediction model to generate the worker index described above. To train the prediction model, machine learning module 224 may receive, as input, one or more sets of training data generated by pre-processing agent 202. The training data utilized by machine learning module 224 may include, but is not limited to, attributes of each agent and historical execution data (e.g., including experience level for the underlying tools and the resources required). Machine learning module 224 may implement one or more machine learning algorithms to train the prediction model to generate the worker index for each worker device 102. Machine learning module 224 may use one or more, a decision tree learning model, association rule learning model, artificial neural network model, deep learning model, inductive logic programming model, support vector machine model, clustering mode, Bayesian network model, reinforcement learning model, representational learning model, similarity and metric learning model, rule based machine learning model, and the like to train the prediction model.

By continuous updating (or optimization) of the worker index, training agent 210 may provide guidance to the key stakeholders in terms of actionable insights with an intuitive interface, such that the workforce is supported by relevant training at the right time.

OM agent 212 may be configured to generate one or more decisions into prescriptive issues. For example, OM agent 212 may assign a set of works to an upcoming demand based on, for example, lead times, order quantities, resource utilization requirements, electronic work instructions, worker historical performances, and the like. Generally, organizations receive a greater benefit out of their improvement efforts when the entire system, as a whole, is considered. When goals are set at a high level, incorporating those constraints that connect multiple components increase the utility of the overall system. Through integrations with external data sources, such as enterprise resource planning, organization computing system 104 may be able to create a system level view. In some embodiments, the system level view takes into account the operations as a whole in a given organization including various job orders, shared resources in terms of workers and equipment, as well as lead times of materials involved and the shipment dates. In some embodiments, the system level view may be created through connections to other systems the organization uses for those purposes such as ERP systems.

OM agent 212 may be configured to utilize this system level view to formulate key decisions into prescriptive problems. For example, the system level view may correspond to the data that enables the application to formulate such problems that improves (or optimizes) a goal function, subject to constraints that ties together the resources in general. An example of a key decision may be the assignment of workers to stations. The prescriptive problem that this decision corresponds may be to minimize the lead time or maximize the utilization of a certain equipment etc. For example, OM agent 212 may be configured to generate key decisions about workforce scheduling by taking into account demand and lead time constraints. Such key decisions may provide preventive maintenance decisions making use of the utilization and performance data through workers' cycle time. For example, data collected through IOT systems and ERP systems may be merged together with the frontline worker performance data, thereby providing input into determining when or if an equipment should undergo a preventive maintenance in order to avert a future outage.

OM agent 212 may include machine learning module 226. Machine learning module 222 may include one or more instructions to train a prediction model to generate the key decisions described above. To train the prediction model, machine learning module 226 may receive, as input, one or more sets of training data generated by pre-processing agent 202. The training data utilized by authoring agent 204 may include information collected from third party software that organizations may use to manage the operations that are not captured by organization computing system. Such data may be collected via TOT, ERP, or CRM systems and combined together with the proprietary data collected or generated by organization computing system 104, such as, but not limited to, cycle time, historical performance, resource utilization, etc. Machine learning module 226 may implement one or more machine learning algorithms to train the prediction model to generate the key decisions. Machine learning module 226 may use one or more, a decision tree learning model, association rule learning model, artificial neural network model, deep learning model, inductive logic programming model, support vector machine model, clustering mode, Bayesian network model, reinforcement learning model, representational learning model, similarity and metric learning model, rule-based machine learning model, and the like to train the prediction model.

Figure 3:
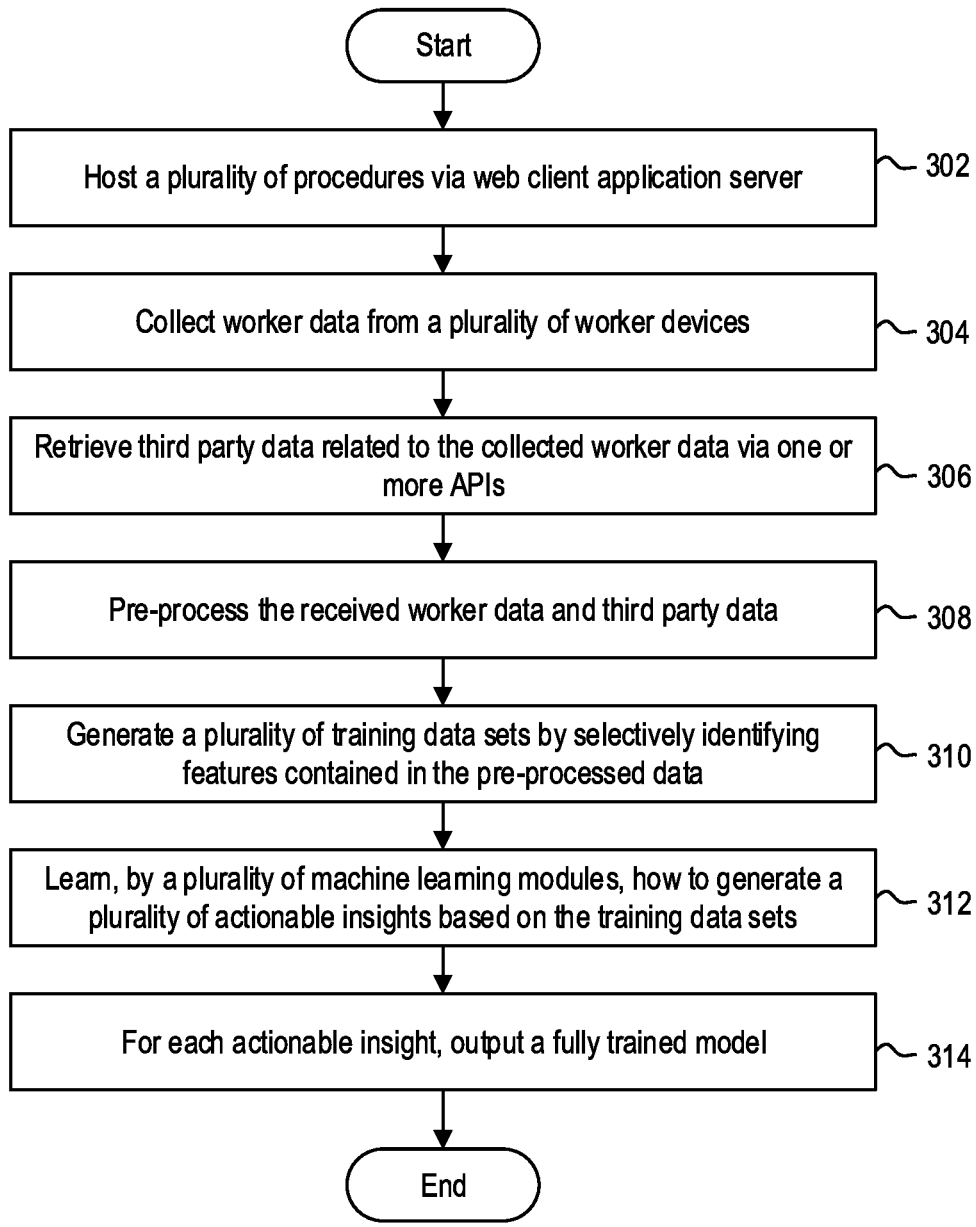
FIG. 3 is a flow diagram illustrating a method of training a plurality of prediction models, according to example embodiments.

FIG. 3 is a flow diagram illustrating a method of generating a prediction model for improving a human-centric process, according to example embodiments. Method 300 may begin at step 302.

At step 302, organization computing system 104 may host a plurality of work procedures via web client application server 118. For example, web client application server 118 may provide access to a plurality of work procedures generated by one or more author devices 106. Each work procedure may include a plurality of steps to accomplish the end result. Each step may be defined by a collection of different types of units of work ("card"). An author may utilize a variety of different types of cards, such as, but not limited to, text, table, checklist, images, videos, and the like.

At step 304, organization computing system 104 may collect worker data from a plurality of worker devices 102. For example, web client application server 118 may collect worker data from a worker device 102. Exemplary worker data may include, but is not limited to, up and down times, utilization of various media helpers, the order in which instructions are carried out, underlying experience, historical skill training sessions each worker attended, experience history with requesting organizations, and historical performance of the worker device 102, and the like.

At step 306, organization computing system 104 may exchange third party data related to the collected worker data via one or more APIs. In some embodiments, the third party data may be related to data generated by author device 108. In some embodiments, the third party data may be related to data generated by analyst device 106. In some embodiments, the third party data may be related to data generated by remote expert devices 110. Generally, third party data may include specifics about an outsourced group of users. For example, when functionality of organization computing system 104 may be accessed within an extended user setting, which may occur when customers of organization computing system 104 are outsourcing their operations, the third party data may be representative of the specifics of that outsourced group of users.

At step 308, organization computing system 104 may pre-process the received data. For example, pre-processing module 202 may pre-process the retrieved data such that the data collected from various sources (e.g., worker device 102, analyst device 106, author device 108, and remote expert device 110) are standardized and normalized. In some embodiments, pre-processing module 202 may store the standardized and normalized data in transaction database 124. For example, pre-processing module 202 may store the standardized and normalized data in transaction database 124 in accordance with a work procedure.

At step 310, organization computing system 104 may generate a plurality of training data sets by selectively identifying features contained in the pre-processed data. For example, pre-processing module 202 may generate a plurality of training sets for each of authoring agent 204, job execution agent 206, job outcome agent 208, training agent 210, and OM agent 212. In some embodiments, pre-processing module 202 may selectively identify features contained in the pre-processed data via NLP device 121. NLP device 214 may be configured to retrieve prepared data from transaction database 124 and scan the prepared data to learn and understand the content contained therein. NLP device 214 may then selectively identify portions of the prepared data that correspond to each respective agent. Based on this identification, pre-processing agent 202 may extract certain features for preparation of a data set for a particular agent.

In some embodiments, for authoring agent 204, pre-processing agent 202 may generate a plurality of data sets that includes information directed to the electronic work instructions themselves. For example, as previously mentioned, organization computing system 104 allows authors to define work instructions in a highly structured way. Accordingly, one of the primary data sources of input for the algorithms is this structure (e.g., the way in which the instructions may be organized). In some embodiments, the information may further include the changes and the sequence of those changes that are made to the instructions that capture the process of authoring. In some embodiments, the information may further include data about how those instructions carried out by the workers. In some embodiments, for job execution agent 206, pre-processing agent 202 may generate a plurality of data sets that include information directed to up and down times, utilization of various media helpers, the order in which instructions are carried out, underlying experience and historical performance of the workers, and the like. In some embodiments, for job outcome agent 208, pre-processing agent may generate a plurality of data sets that includes information directed to time spent on productive and non-productive sections of each card (or step), the information related to the identity of the worker device 102, status and quality of the underlying products that are being worked on, the corresponding tools involved in the operation, and the like. In some embodiments, for training agent 210, pre-processing agent 202 may generate a plurality of data sets related to attributes of each agent and historical execution data (e.g., including experience level for the underlying tools and the resources required). In some embodiments, for OM agent 212, pre-processing agent 202 may generate a plurality of data sets related to third party software that organizations may use to manage the operations that are not captured by the present system. Exemplary software may include, but are not limited to, TOT devices/software, ERP devices/software, or CRM systems. Such information may be combined with the proprietary data collected by organization computing system 104, such as, but not limited to, cycle time, historical performance, resource utilization, etc.

At step 312, organization computing system 104 may learn, via a plurality of machine learning modules, how to generate a plurality of actionable insights based on the generate training data sets. For example, machine learning module 216 may train a first prediction model to generate the author index actionable insight. Machine learning module 218 may train a second prediction model to generate one or more actionable insights for improving work instructions for a given worker device 102. Machine learning module 220 may train a third prediction model to generate a raw opportunity score. Machine learning module 222 may train a fourth prediction model to generate a worker index, which may quantify the learning needs and performance index of each worker (e.g., worker device 102). Machine learning module 224 may train a fifth prediction model to generate one or more decisions into prescriptive issues.

At step 314, organization computing system 104 may output a fully trained prediction model for each actionable insight. In other words, each respective agent (authoring agent 204, job execution agent 206, job outcome agent 208, training agent 210, and OM agent 212) may generate its own fully trained prediction model. Each prediction model may be used to generate a respective actionable insight.

Figure 4:
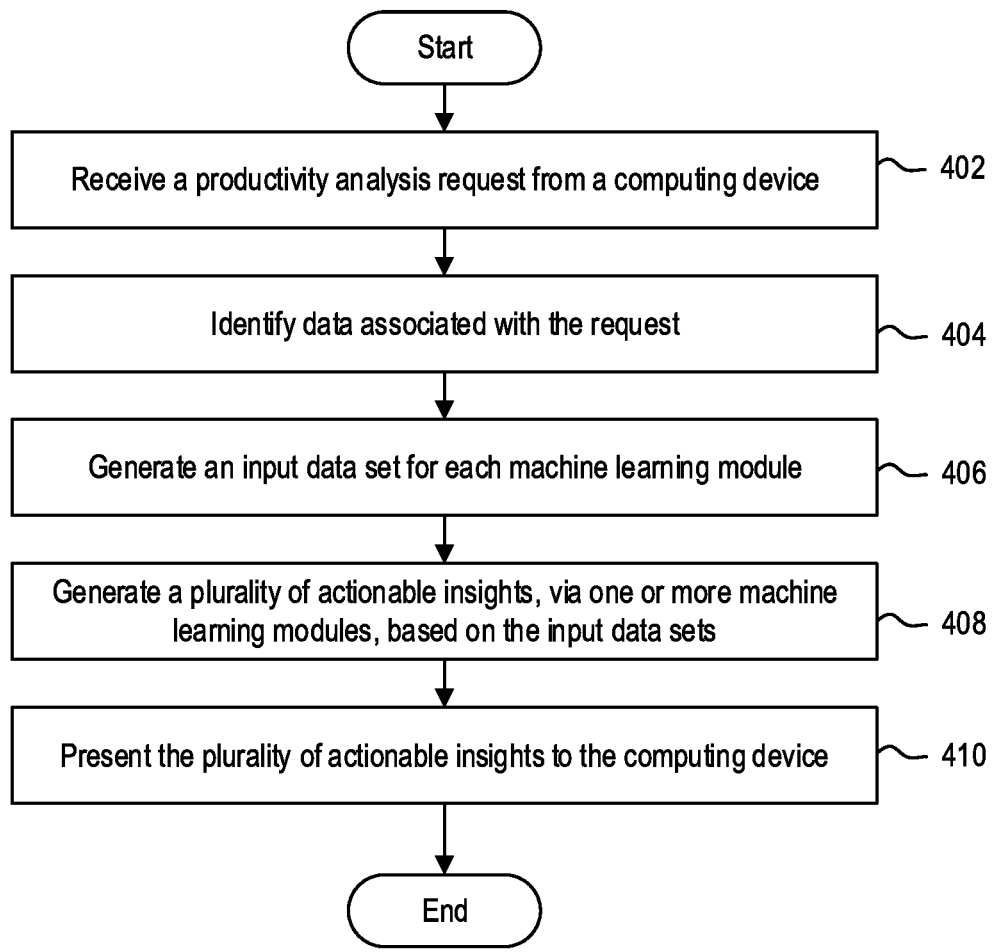
FIG. 4 is a flow diagram illustrating a method of generating a plurality of actionable insights, according to example embodiments.

FIG. 4 is a flow diagram illustrating a method 400 of generating a plurality of actionable insights, according to example embodiments. Method 400 may begin at step 402.

At step 402, organization computing system 104 may receive an actionable insight request from a computing device. In some embodiments, web client application server 118 may receive the request from analyst device 106. In some embodiments, web client application server 118 may receive the request from author device 108.

At step 404, organization computing system 104 may identify data associated with the received request. In some embodiments, the received request may include a request for actionable insights for a particular work procedure. Accordingly, pre-processing agent 202 may retrieve, from transactional database 124, data directed to the particular work procedure.

At step 406, organization computing system 104 may generate an input data set for each actionable insight. In other words, pre-processing module 202 may generate an input data set for each of authoring agent 204, job execution agent 206, job outcome agent 208, training agent 210, and OM agent 212. In some embodiments, pre-processing module 202 may selectively identify features contained in the pre-processed data via NLP device 121. NLP device 214 may be configured to retrieve prepared data from transaction database 124 and scan the prepared data to learn and understand the content contained therein. NLP device 214 may then selectively identify portions of the prepared data that correspond to each respective agent. Based on this identification, pre-processing agent 202 may extract certain features for preparation of a data set for a particular agent.

In some embodiments, for authoring agent 204, pre-processing agent 202 may generate an input data set that includes information directed to electronic work instructions. As previously stated, organization computing system 104 may allow authors to define the work instructions in a highly structured way. The way in which authors define such work instructions may be used as input to machine learning module. For example, information about the way in which the instructions are organized may be used as input. In some embodiments, the data may further include the changes and the sequence of those changes that are made to the instructions. In some embodiments, the data may also include information about how those instructions carried out by the workers. In some embodiments, for job execution agent 206, pre-processing agent 202 may generate an input data set that include information directed to up and down times, utilization of various media helpers, the order in which instructions are carried out, underlying experience and historical performance of the workers, and the like. In some embodiments, for job outcome agent 208, pre-processing agent may generate an input data set that includes information directed to time spent on productive and non-productive sections of each card (or step), the information related to the identity of the worker device 102, status and quality of the underlying products that are being worked on, the corresponding tools involved in the operation, and the like. In some embodiments, for training agent 210, pre-processing agent 202 may generate an input data set related to attributes of each agent and historical execution data (e.g., including experience level for the underlying tools and the resources required). In some embodiments, for OM agent 212, pre-processing agent 202 may generate an input data set related to information captured by third party software. Exemplary information may be collected through TOT, ERP, or CRM systems and combined together with the proprietary data collected or generated by organization computing system 104, such as cycle time, historical performance, resource utilization, etc.

At step 408, organization computing system 104 may generate a plurality of actionable insights, via one or more machine learning modules, based on the input data sets. For example, authoring agent 204 may generate the author index actionable insight. Job execution agent 206 may generate one or more actionable insights for improving work instructions for a given worker device 102. Job outcome agent 208 may generate a raw opportunity score. Training agent may generate a worker index, which may quantify the learning needs and performance index of each worker (e.g., worker device 102). OM agent 212 may generate one or more decisions into prescriptive issues.

At step 410, organization computing system 104 may present the plurality of actionable insights to the requesting device. For example, organization computing system 104 may generate a portal, through which a user may access to view actionable insights generated by analytics server 122.

In some embodiments, the system may generate a hierarchy of procedures and steps with the most capturable productivity gains based on data corresponding to the current work procedure. For example, the system may implement one or more machine learning processes to identify those workers that are likely to receive the most capturable productivity gains with additional training. In another example, the system may implement one or more machine learning processes for identifying work instructions that may aid the worker to achieve the "best" results, in terms of safety, quality and productivity. In another example, the system may implement one or more machine learning processes for identifying a remote human expert likely to aid in resolving a given problem encountered by a given worker. In another example, the system may implement one or more machine learning processes for identifying a best course of action for solving a problem for a worker.

FIG. 5 is a block diagram illustrating an exemplary computing environment 500, according to some embodiments. Computing environment 500 includes computing system 502 and computing system 552. Computing system 502 may be representative of worker device 102. Computing system 552 may be representative of analytics server 122.

Computing system 502 may include a processor 504, a memory 506, a storage 508, and a network interface 510. In some embodiments, computing system 502 may be coupled to one or more I/O device(s) 512 (e.g., keyboard, mouse, etc.).

Processor 504 may retrieve and execute program code 520 (i.e., programming instructions) stored in memory 506, as well as stores and retrieves application data. Processor 504 may be included to be representative of a single processor, multiple processors, a single processor having multiple processing cores, and the like. Network interface 510 may be any type of network communications allowing computing system 502 to communicate externally via computing network 505. For example, network interface 510 is configured to enable external communication with computing system 552.

Storage 508 may be, for example, a disk storage device. Although shown as a single unit, storage 508 may be a combination of fixed and/or removable storage devices, such as fixed disk drives, removable memory cards, optical storage, network attached storage (NAS), storage area network (SAN), and the like.

Memory 506 may include operating system 514, program code 516, and application 518. Program code 516 may be accessed by processor 504 for processing (i.e., executing program instructions). Program code 516 may include, for example, executable instructions for communicating with a web server (e.g., web client application server 118) to display one or more pages of a website hosting a work procedure. Application 518 may enable a user of computing system 502 to access a functionality of computing system 552.

Computing system 552 may include a processor 554, a memory 556, a storage 558, and a network interface 560. In some embodiments, computing system 552 may be coupled to one or more I/O device(s) 562. In some embodiments, computing system 552 may be in communication with transactional database 124 and/or insights database 126.

Processor 554 may retrieve and execute program code 566 (i.e., programming instructions) stored in memory 556, as well as stores and retrieves application data. Processor 554 is included to be representative of a single processor, multiple processors, a single processor having multiple processing cores, and the like. Network interface 560 may be any type of network communications enabling computing system 552 to communicate externally via computing network 505. For example, network interface 560 allows computing system 552 to communicate with computer system 502.

Storage 558 may be, for example, a disk storage device. Although shown as a single unit, storage 558 may be a combination of fixed and/or removable storage devices, such as fixed disk drives, removable memory cards, optical storage, network attached storage (NAS), storage area network (SAN), and the like.

Memory 556 may include operating system 564, program code 566, pre-processing module 570, authoring agent 572, job execution agent 574, job outcome agent 576, training agent 578, and OM agent 580. Program code 566 may be accessed by processor 554 for processing (i.e., executing program instructions). Program code 566 may include, for example, executable instructions configured to perform one or more operations discussed above in conjunction with FIGS. 3-4. As an example, processor 554 may access program code 568 to perform operations related training prediction models for generating metrics associated with a work procedure, workers, and the overall system. In another example, processor 554 may access program code 568 to dynamically generate actionable insights directed to, at least, work procedures, workers, and the overall system.

Pre-processing agent 570 may be configured to process data received from one or more of analyst device 106, author device 108, remote expert device 110, and/or client device 102. For example, pre-processing agent 570 may be configured to extract relevant information for the raw data and format it in a way that is compatible with an underlying algorithm, in which the data is used as input. In some embodiments, pre-processing agent 570 may identify up and down times of the work executions, of out of ordinary data points, remove irrelevant or noisy data points based upon the feedback from analysts, and the like. In some embodiments, pre-processing agent 570 may further use data enhancement techniques such as, but not limited to, combining data points coming from different versions of work instructions based upon their similarity. Such prepared data may be stored in transactional database 124. In some embodiments, pre-processing agent 202 may further be configured to extract one or more features from the prepared data via natural language processing techniques. For example, pre-processing agent 202 may be configured to generate one or more data sets for each of authoring agent 204, job execution agent 206, job outcome agent 208, training agent 210, and OM agent 212 by extracting select features from the prepared data.

Authoring agent 572 may be configured to aid in reducing the time it takes to reach an "optimal" procedure by providing insights to a work procedure through the use of the underlying procedure definition data, the experience representation (which may be built using historical data of successful work procedures) and correlations with execution patterns. For example, authoring agent 572 may be configured to generate actionable insights about an instruction's impact on the speed of execution, consistency of cycle time, and the quality of outcomes. Authoring agent 572 may generate a unique measure called "author index," which may help organizations assess the needs of the authors and improve their skills, as well as better match their qualifications to upcoming tasks.

Job execution agent 574 may be configured to continuously measure the "goodness" of the executions of underlying instructions based on, for example, up and down times, utilization of various media helpers, the order in which instructions are carried out, underlying experience and historical performance of the workers, and the like. Based on the value generated by job execution agent 574, the system may be configured to provide dynamically optimized and individualized work instructions to enable each worker device to perform each time in the least amount of time possible, while achieving quality, safety, and productivity goals. In some embodiments, to achieve such dynamic optimization goal, the system may use techniques that involve, but are not limited to, exhibition or concealment of certain helper content, providing training refreshers, switching from verbose or succinct versions of the instructions, variations in the order in which steps are presented, and the like. In some embodiments, job execution agent 574 may further provide unique insights into how the underlying worker execution fits with the set of identified goals, what kind of automatic interventions have been applied, and what kind of results have been attained from them. For example, job execution agent 574 may provide to workers different variants of a procedure (e.g. verbose versus concise instructions). Accordingly job execution agent 574 may measure how well each variant has performed and suggest potential changes.

Job outcome agent 576 may be configured to generate an opportunity value for a work procedure. For example, job outcome agent 576 may be configured to generate a raw opportunity score based on, for example, time spent on productive and non-productive sections of each card (or step), the information related to the identity of the computing system 502, status and quality of the underlying products that are being worked on, the corresponding tools involved in the operation, and the like. From the raw opportunity score, job outcome agent 576 may generate a true opportunity score. The true opportunity score may be determined against a data driven benchmarks using techniques that involve, but are not limited to, identification and exclusion of noisy data points, adjustments taking into account the historical performance of the agents quality, and resource state indicators. In some embodiments, the true opportunity score may be continuously updated as more data is available to the system. Accordingly, job outcome agent 576 may provide a forward looking value that may be attained as a productivity improvement. Moreover, in some embodiments, job outcome agent 576 may qualify this score in terms of how much effort it would involve for the productivity improvement. This effort value may be attributed to various interventions that need to be done, such as, but not limited to, training required for the works or enhancements that should be made to the underlying procedure.

Training agent 578 may be configured to generate a multidimensional representation of the current state of the worker (e.g., associate/agent) in relation to the relative complexity of the activities involved in the current tasks that the given individual is assigned by making use of attributes of the worker and historical execution data collected by the platform. This representation of the worker may be used to quantify the learning needs and the performance index of the worker, i.e., the worker index. This score may constitute the basis for the continuous assessment of the training needs of each worker. By continuous updating (or optimization) of the worker index, training agent 578 may provide guidance to the key stakeholders in terms of actionable insights with an intuitive interface, such that the workforce is supported by relevant training at the right time.

OM agent 580 may be configured to utilize this system level view to formulate key decisions into prescriptive solutions to identified problems. In some embodiments, the system level view takes into account the operations as a whole in a given organization including various job orders, shared resources in terms of workers and equipment, as well as lead times of materials involved and the shipment dates. In some embodiments, the system level view may be created through connections to other systems the organization uses for those purposes such as ERP systems.

OM agent 580 may be configured to generate key decisions about workforce scheduling by taking into account demand and lead time constraints, as well as identified worker expertise level. For example, the system level view may correspond to the data that enables the application to formulate such problems that improves (or optimizes) a goal function, subject to constraints that ties together the resources in general. An example of a key decision may be the assignment of workers to stations. The prescriptive problem that this decision corresponds may be to minimize the lead time or maximize the utilization of a certain equipment etc. For example, OM agent 580 may be configured to generate key decisions about workforce scheduling by taking into account demand and lead time constraints. Such key decisions may provide preventive maintenance decisions making use of the utilization and performance data through workers' cycle time. For example data collected through IOT systems and ERP systems may be merged together with the frontline worker performance data, thereby providing input into determining when or if an equipment should undergo a preventive maintenance in order to avert a future outage.

While the foregoing is directed to embodiments described herein, other and further embodiments may be devised without departing from the basic scope thereof. For example, aspects of the present disclosure may be implemented in hardware or software or a combination of hardware and software. One embodiment described herein may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory (ROM) devices within a computer, such as CD-ROM disks readably by a CD-ROM drive, flash memory, ROM chips, or any type of solid-state non-volatile memory) on which information is permanently stored; and (ii) writable storage media (e.g., floppy disks within a diskette drive or hard-disk drive or any type of solid state random-access memory) on which alterable information is stored. Such computer-readable storage media, when carrying computer-readable instructions that direct the functions of the disclosed embodiments, are embodiments of the present disclosure.

It will be appreciated to those skilled in the art that the preceding examples are exemplary and not limiting. It is intended that all permutations, enhancements, equivalents, and improvements thereto are apparent to those skilled in the art upon a reading of the specification and a study of the drawings are included within the true spirit and scope of the present disclosure. It is therefore intended that the following appended claims include all such modifications, permutations, and equivalents as fall within the true spirit and scope of these teachings.

What is claimed:

1. A method of generating a plurality of actionable insights, comprising:
   retrieving, by a computing system, data corresponding to a plurality of work procedures, wherein the data corresponding to each work procedure comprising:
      a first set of data corresponding to an author of instructions corresponding to the work procedure, the instructions comprising a sequence of steps for carrying out the work procedure, the first set of data comprising:
         a type of instruction corresponding to each step in the sequence of steps; and
         a target time for completing each step in the sequence of steps;
      a second set of data corresponding to a worker performing the instructions for carrying out the work procedure, the second set of data comprising:
         an order in which the worker performed the sequence of steps; and
         an actual time for completing each step in the sequence of steps;
   generating, by the computing system, a first predictive model for optimizing the work procedure, by:
      generating a first training set based on the first set of data; and
      learning, by a first machine learning model, to generate an authoring metric corresponding to a quality of the instructions for the work procedure based on the first training set;
   generating, by the computing system, a second predictive model for quantifying a performance of the worker by:
      generating a second training set based on the first set of data and the second set of data; and
      learning, by a second machine learning model, to generate a worker metric quantifying the performance of the worker and learning needs of the worker;
   receiving, by the computing system, a request to optimize a current work procedure;
   accessing, by the computing system, target instructions for carrying out the current work procedure, wherein the target instructions are provided to the worker in a video format;
   receiving, by the computing system, activity data of the worker carrying out the current work procedure, wherein the activity data comprises an indication that the worker has stopped a video of the target instructions for carrying out the current work procedure; and
   optimizing, by the computing system via the first predictive model and the second predictive model, the current work procedure by generating a plurality of actionable insights for improving the work procedure based on the target instructions and the activity data, wherein the plurality of actionable insights comprises an annotation over a portion of the video that the worker has stopped.

2. The method of claim 1, wherein the data corresponding to the work procedure comprises one or more of version information, changes made to the sequence of steps over time, a number of steps in each work procedure, cards corresponding to each step in each work procedure, style of the steps presented to a user in each work procedure, execution data, cycle time of each step, or patterns of up and down times.

3. The method of claim 1, further comprising:
generate a hierarchy of procedures or steps with most capturable productivity gains based on the data corresponding to the current work procedure.

4. The method of claim 1, wherein receiving, by the computing system, the request to generate the plurality of actionable insights for the current work procedure comprises:
monitoring a remote device of a user executing the current work procedure.

5. The method of claim 1, wherein generating the plurality of actionable insights comprises:
generating one or more actionable insights corresponding to an author index actionable insight that quantifies an author's process of authoring electronic work instructions.

6. The method of claim 1, wherein generating the plurality of actionable insights comprises:
generating one or more actionable insights corresponding to a worker index that quantifies learning needs and performance index of each worker.

7. The method of claim 1, further comprising:
generating a portal through which users may view the plurality of actionable insights.

8. A non-transitory computer readable medium comprising one or more sequences of instructions, which, when executed by one or more processors, cause the one or more processors to perform operations, comprising:
retrieving, by a computing system, data corresponding to a plurality of work procedures, wherein the data corresponding to each work procedure comprising:
a first set of data corresponding to an author of instructions corresponding to the work procedure, the instructions comprising a sequence of steps for carrying out the work procedure, the first set of data comprising:
a type of instruction corresponding to each step in the sequence of steps; and
a target time for completing each step in the sequence of steps;
a second set of data corresponding to a worker performing the instructions for carrying out the work procedure, the second set of data comprising:
an order in which the worker performed the sequence of steps; and
an actual time for completing each step in the sequences of steps;
generating, by the computing system, a first predictive model for optimizing the work procedure, by:
generating a first training set based on the first set of data; and
learning, by a first machine learning model, to generate an authoring metric corresponding to a quality of the instructions for the work procedure based the first training set;
generating, by the computing system, a second predictive model for quantifying a performance of the worker by:
generating a second training set based on the first set of data and the second set of data; and
learning, by a second machine learning model, to generate a worker metric quantifying the performance of the worker and learning needs of the worker;
receiving, by the computing system, a request to optimize a current work procedure;
accessing, by the computing system, target instructions for carrying out the current work procedure, wherein the target instructions are provided to the worker in a video format;
receiving, by the computing system, activity data of the worker carrying out the current work procedure, wherein the activity data comprises an indication that the worker has stopped a video of the target instructions for carrying out the current work procedure; and
optimizing, by the computing system via the first predictive model and the second predictive model, the current work procedure by generating plurality of actionable insights for improving the work procedure based on the target instructions and the activity data, wherein the plurality of actionable insights comprises an annotation over a portion of the video that the worker has stopped.

9. The non-transitory computer readable medium of claim 8, wherein the data corresponding to the work procedure comprises one or more of version information, changes made to the sequence of steps over time, a number of steps in each work procedure, cards corresponding to each step in each work procedure, style of the steps presented to a user in each work procedure, execution data, cycle time of each step, or patterns of up and down times.

10. The non-transitory computer readable medium of claim 8, wherein the metric corresponds to a score associated with a quality of the work procedure.

11. The non-transitory computer readable medium of claim 8, wherein receiving, by the computing system, the request to generate the plurality of actionable insights for the current work procedure comprises:
monitoring a remote device of a user executing the current work procedure.

12. The non-transitory computer readable medium of claim 8, wherein generating the plurality of actionable insights comprises:
generating one or more actionable insights corresponding to an author index actionable insight that quantifies an author's process of authoring electronic work instructions.

13. The non-transitory computer readable medium of claim 8, wherein generating the plurality of actionable insights comprises:
generating one or more actionable insights corresponding to a worker index that quantifies the learning needs and performance index of each worker.

14. The non-transitory computer readable medium of claim 8, further comprising:
generating a portal through which users may view the plurality of actionable insights.

15. A system, comprising:
a processor; and a memory having programming instructions stored thereon, which, when executed by the processor, performs one or more operations comprising:
retrieving data corresponding to a plurality of work procedures, wherein the data corresponding to each work procedure comprising:
  a first set of data corresponding to an author of instructions corresponding to the work procedure, the instructions comprising a sequence of steps for carrying out the work procedure, the first set of data comprising:
    a type of instruction corresponding to each step in the sequence of steps; and
    a target time for completing each step in the sequence of steps;
  a second set of data corresponding to a worker performing the instructions for carrying out the work procedure, the second set of data comprising:
    an order in which the worker performed the sequence of steps; and
    an actual time for completing each step in the sequences of steps;
generating a first predictive model for optimizing the work procedure, by:
  generating a first training set based on the first set of data; and
  learning, by a first machine learning model, to generate an authoring metric corresponding to a quality of the instructions for the work procedure based on the first training set;
generating a second predictive model for quantifying a performance of the worker by:
  generating a second training set based on the first set of data and the second set of data; and
  learning, by a second machine learning model, to generate a worker metric quantifying the performance of the worker and learning needs of the worker;
receiving a request to optimize a current work procedure;
accessing target instructions for carrying out the current work procedure, wherein the target instructions are provided to the worker in a video format;
receiving activity data of the worker carrying out the current work procedure, wherein the activity data comprises an indication that the worker has stopped a video of the target instructions for carrying out the current work procedure; and
optimizing, via the first predictive model and the second predictive model, the current work procedure by generating plurality of actionable insights for improving the work procedure based on the target instructions and the activity data, wherein the plurality of actionable insights comprises an annotation over a portion of the video that the worker has stopped.

16. The system of claim 15, wherein the data corresponding to the work procedure comprises one or more of version information, changes made to the sequence of steps over time, a number of steps in each work procedure, cards corresponding to each step in each work procedure, style of the steps presented to a user in each work procedure, execution data, cycle time of each step, or patterns of up and down times.

17. The system of claim 15, wherein receiving the request to generate the plurality of actionable insights for the current work procedure comprises:
  monitoring a remote device of a user executing the current work procedure.

18. The system of claim 15, wherein generating the plurality of actionable insights comprises:
  generating one or more actionable insights corresponding to an author index actionable insight that quantifies an author's process of authoring electronic work instructions.

19. The system of claim 15, wherein generating the plurality of actionable insights comprises:
  generating one or more actionable insights corresponding to a worker index that quantifies the learning needs and performance index of each worker.

20. The system of claim 15, wherein the one or more operations further comprise:
  generating a portal through which users may view the plurality of actionable insights.

* * * * *